(12) United States Patent
Viaud

(10) Patent No.: US 7,584,594 B2
(45) Date of Patent: Sep. 8, 2009

(54) FEED CHANNEL WALL FOR AN AGRICULTURAL HARVESTER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/686,485

(22) Filed: Mar. 15, 2007

(65) Prior Publication Data
US 2008/0028738 A1 Feb. 7, 2008

(30) Foreign Application Priority Data
Aug. 4, 2006 (DE) .................. 10 2006 036 588

(51) Int. Cl.
*A01D 89/00* (2006.01)
*A01D 43/02* (2006.01)
(52) U.S. Cl. .......................... 56/364; 56/341
(58) Field of Classification Search .................. 56/341, 56/364, 16.4 R; 460/62, 63, 71, 72, 107–109
See application file for complete search history.

(56) References Cited

U.S. PATENT DOCUMENTS 5,819,517 A * 10/1998 Amanatidis et al. ........... 56/341

7,252,587 B2 * 8/2007 Viaud ........................ 460/109
2005/0198936 A1 * 9/2005 Viaud .......................... 56/341

FOREIGN PATENT DOCUMENTS

| DE | 195 46 263 | 6/1997 |
|----|-----------|--------|
| DE | 198 41 598 | 3/2000 |
| EP | 1 574 124 | 9/2005 |

OTHER PUBLICATIONS

European Search Report. Nov. 15, 2007, 5 Pages.

* cited by examiner

*Primary Examiner*—Thomas B Will
*Assistant Examiner*—Joan D Misa

(57) ABSTRACT

A press is provided with a feed channel, whose feed channel wall, in the event of overload, can be pivoted away from a feed rotor. The pivotal motion of the feed channel wall is realized about an upstream bearing, which, by means of a link, is itself moved away from the feed rotor in an upright guide. The motion within the guide is derived from the pivot motion of the feed channel wall away from the feed rotor. A hydraulic cylinder, working against a spring defined by an accumulator, is coupled to a downstream end of the channel wall and resists movement of the channel wall away from the feed rotor, but yields under a preselected crop load.

5 Claims, 4 Drawing Sheets

# FEED CHANNEL WALL FOR AN AGRICULTURAL HARVESTER

FIELD OF THE INVENTION

The invention relates to a feed channel wall having an upstream bearing and a downstream connector for a control apparatus which, on the other hand, can be attached to a machine, and having a line between the upstream bearing and a machine-side bearing, and further relates to an agricultural harvester.

BACKGROUND OF THE INVENTION

DE 198 41 598 A 1 shows a round baler having a cutting apparatus in a feed channel between a pick-up and a pressing chamber. The bottom of the feed channel can be lowered at both ends in order to prevent a clear crop jams. The upstream end is connected to the pick-up by means of links, which are controlled by a hydraulic cylinder.

The problem on which the invention is founded lies in the perception that the positioning control of the upstream end region is too complex.

SUMMARY OF THE INVENTION

This problem is solved according to the invention by the teaching of Patent Claim 1, the other patent claims detailing features which advantageously refine the solution.

In this way, both end regions of the feed channel wall are controlled in their position by means of just one control apparatus. The use of two bearings at the upstream end region, which are connected on the machine side, produces a forced guidance, which is dependent on the position of the downstream end region. The bearing, as well as the guide, can be configured as plain or roller bearings and are located on the duct wall or the machine, i.e., for example, on the crop receiver or the frame of the machine, for example on a press or a loader wagon. The guide can be formed in a slot, a curved track, a rod system or the like. The adjustment on the basis of the guide can be made transversely to and/or along the feed flow, resilient elements or overload safety devices also being able to be used.

If the guide has a curvature, depending on the configuration of the curvature, a progressive or a regressive instead of a linear adjustment can be made, depending on the requirements. The curvature—even or uneven—also determines the direction in which the adjustment is made.

If the link to the straight line joining all the upstream bearings forms no angle or only a slight angle, it can brace itself against the influencing force of the feed flow and thus prevent friction against the guide, leading to a reduction in wear. In this case, the feed channel wall is in a very stable position, partly due to its bearing contact against the end of the guide.

A triangular arrangement of the upstream bearings has the result that the feed channel wall moves as far as possible away from the guide, i.e. widens the feed channel, in order to prevent crop jam problems.

An external-force-actuated control apparatus, for example a hydraulic cylinder or electric motor, can be easily driven via a switching circuit, which can be operated both from the press and from a towing vehicle. Such an external-force-control can be realized both manually and automatically. In simple construction, this adjustment could also however be performed by a rod system, a lever or the like.

The controlling of the control apparatus on the basis of parameters of the feed crop flow allows a rapid reaction to indications of a blockage. Thus, the pressure transversely to the feed flow, as well as a torque at the feed rotor, can form a suitable signal for the adjustment of the control apparatus. On the other hand, the crop density can also be detected with ultrasound or the like and converted into a signal.

The use of a spring (mechanical, pneumatic, pressure relief valve in a hydraulic circuit, etc.) has the advantage that load peaks can be absorbed without this immediately resulting in an adjustment of the feed channel wall.

Although there are many usage conditions in which crop is transported and can lead to a crop jam, for example in the transport of potential recyclables and waste in industry, of agricultural products in silos, in animal houses, etc., the danger of blockage in agricultural presses and loader wagons used in the field is particularly critical, since blockages are there difficult to clear and delay the harvest, which may lead to crop losses in poor weather. The use of the invention in the poorly accessible region between the crop receiver and the crop reservoir is therefore particularly advantageous.

BRIEF DESCRIPTION OF THE DRAWINGS

An illustrative embodiment of the invention, described in greater detail below, is represented in the drawing, in which.

DESCRIPTION OF THE PREFERRED EMBODIMENT

Figure 1:
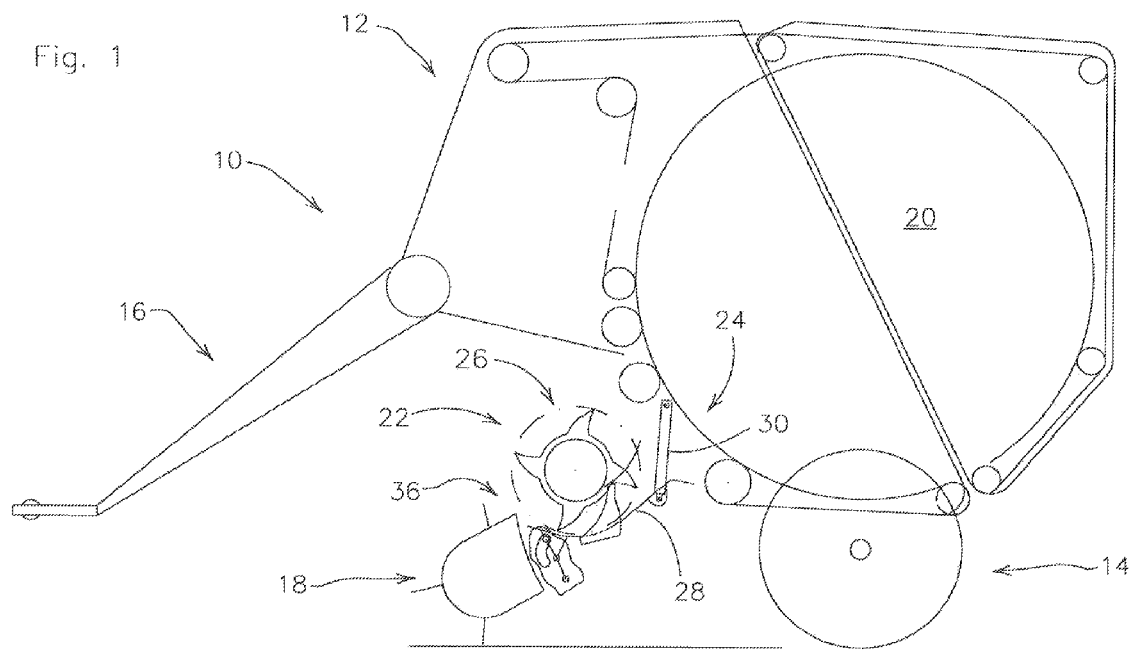
FIG. 1 shows a press having a feed channel wall according to the invention in side view and in schematic representation.

A press 10, shown in FIG. 1, is of standard construction, i.e., it has a superstructure 12, a chassis 14, a drawbar 16, a crop receiver 18, a crop reservoir 20 and a feed apparatus 22.

The press 10 is represented as a drawn press 10 having a size-variable crop reservoir 20; it could equally well be a self-propelling press 10 and/or one having a constant-size crop reservoir 20, the type of (non-detailed) press elements being immaterial.

The superstructure 12 rests on the chassis 14 and bears the crop receiver 18 and the feed apparatus 22 and forms the crop reservoir 20 between (non-detailed) side walls.

The chassis 14 contains a rigidly or resiliently fitted axle and wheels.

The drawback 16 is connected in a rigid, or a vertically pivotable, manner to the superstructure 12 and serves for the connection to a towing vehicle (not shown).

The crop receiver 18 is also referred to as a pick-up and is connected in a vertically movable manner to the superstructure 12, as is likewise known.

The crop reservoir 20, at a front, lower region, has an inlet 24 for the fed crop, which connects directly to the feed apparatus 22.

Figure 2:
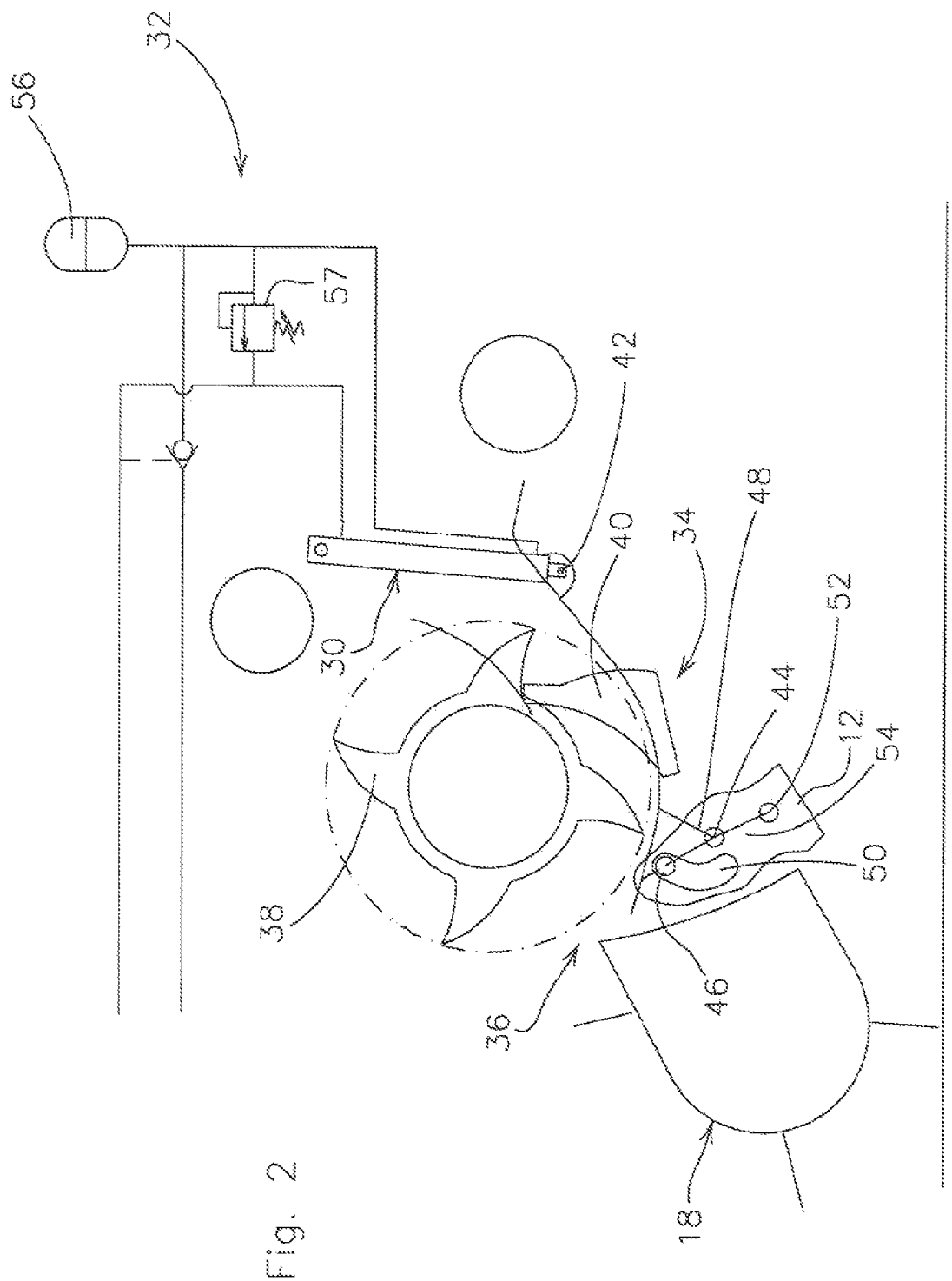
FIG. 2 shows the feed channel wall in a position nearest to a feed rotor and having a hydraulic circuit for a control apparatus.

The feed apparatus 22 can be rigidly or movably connected to the crop receiver 18 or the superstructure 12 and contains, inter alia, a feed rotor 26, a feed channel wall 28, a control apparatus 30 and, in this illustrative embodiment, a hydraulic circuit 32 for the control apparatus 30 and, as indicated in FIG. 2, a cutting apparatus 34. The feed apparatus 22 has the function of accepting crop brought up from the crop receiver 18 and of transporting it cut, or uncut, into the crop reservoir 20. According to the nature of the crop per se or the density of the crop flow, there is always the danger of blockages, in the zone ahead of which an increased pressure may develop upon the feed channel wall 28. The region between the crop receiver 18 and the inlet 24 includes a feed channel 36 defined by the feed channel wall 28, the feed rotor 26 and side walls (not shown).

The feed rotor 26 can be driven in both directions and has drivers 38, which convey the fed crop against the blades 40 of the cutting apparatus 34, if such are present. In the position of the feed channel wall 28 according to FIGS. 1 and 2, the drivers 38 reach close up to these.

The feed channel wall 28 extends between the crop receiver 18 and the inlet 24 and follows essentially the periphery of the feed rotor 26 over about a quarter of its circumference. Whilst the drawing shows an undershot feed apparatus 22, the invention could similarly be used on an overshot feed apparatus 22. On the side remote from the feed rotor 26, there is located on the feed channel 28 at its downstream end region a connector 42, at its upstream end region a first bearing 44, and in the vicinity of the latter a second bearing 46. In this specific illustrative embodiment, the first and the second bearing 44 and 46 are located on a support 48, which can simultaneously serve as a reinforcement for the feed channel wall 28. If perpendiculars are drawn onto the surface of the feed channel wall 28 and through the first and the second bearing 44, 46, these are spaced mutually apart, the second bearing 46 being located closer to the upstream end than the first bearing 44; moreover, the first bearing 44 has a greater distance to the feed surface of the feed channel wall 28 than does the second bearing 46. The connector 42 and the bearings 44 and 46 can be configured both as pins, screws and as a continuous rod, etc. Although the connector 42 and the bearings 44, 46 are placed beneath the feed channel wall 28, i.e. on its side remote from the feed rotor 26, since this is easier to manufacture and install, the connector 42 and the bearings 44, 46 could also, however, be provided on its other side. At the upstream end region of the feed channel wall 28 there is a guide 50, which receives the second bearing 46 slidably within it. In this illustrative embodiment, the guide 50 is configured as a slot in a plate attached to the crop receiver 18 or to the superstructure 12. The guide 50 is of substantially kidney-shaped configuration and is vertically disposed. At least on each side of the feed apparatus 22, a guide 50 is provided.

In addition, on each side of the crop receiver 18 or the superstructure 12 there is provided a machine-side bearing 52, and between this machine-side bearing 52 and the first bearing 44, respectively a link 54, which is accommodated such that it is pivotably movable at both ends. The link 54 is dimensioned such that it lies essentially on a straight line which extends through the machine-side bearing 52, the first bearing 44 and the second bearing 46 when the feed channel wall 28 is in its position nearest to the feed rotor 26, in which the second bearing 46 bears against the upper end of the guide 50. When the feed channel wall 28 is in its lowered position, the machine-side bearing 52, the first bearing 44 and the second bearing 46 form essentially a right-angled triangle, one side of which is formed by the link 54.

The downstream connector 42 is located close to the feed surface of the feed channel wall 28 in a straight-ending portion. The feed channel wall 28 is provided in the curved region with slots (not shown), through which the blades 40 can extend.

The control apparatus 30 is configured in this illustrative embodiment as a double-acting hydraulic cylinder having its rod end coupled to the downstream connector 42 and it cylinder end connected to the superstructure 12. The control apparatus 30 extends essentially vertically and is connected to the hydraulic circuit 32 (shown purely in simplified representation), which, inter alia, has a spring 56 in the form of a gas pressure accumulator coupled to the piston rod side of the cylinder. This spring 56 is loaded so as to resist downward movement of the feed channel wall, but, when an excessive amount of feed crop is drawn into the feed channel 36 a pilot-operated relief valve 57 opens and permits the feed channel wall 28 to move away from the feed rotor 26.

The hydraulic circuit 32 is conventionally configured and can be operated manually or automatically such that it moves the feed channel wall 28 away from the feed rotor 26 or up to the latter. The hydraulic circuit 32 is shown only in FIG. 2, purely for the sake of simplicity, but otherwise, in this illustrative embodiment, is constantly included. In principle, a mechanical or electrical adjustment could also, however, be chosen.

The cutting apparatus 34 is likewise conventionally configured and is represented only by the blades 40. According to this, the blades 40 are mounted in a frame and can both deflect counter to spring load in the event of overload and be deliberately pivoted out of the feed channel 36 or disassembled in order to free the feed channel 36. The blades 40 reach quite close up to the feed rotor 26.

According to all that, the following function based on a normal operating mode, as shown in FIGS. 1 and 2, is obtained.

Figure 3:
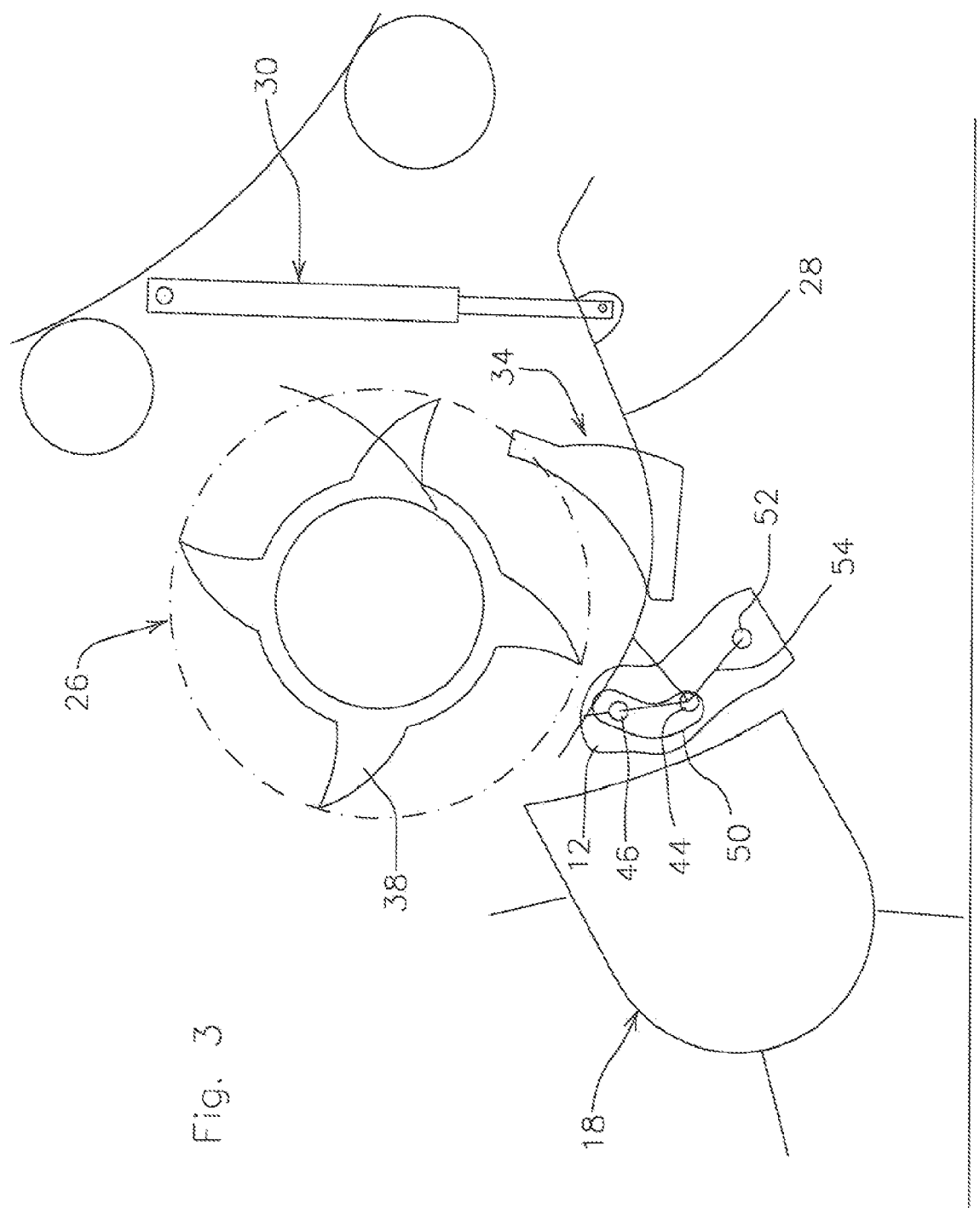
FIG. 3 shows the feed channel wall in a partly pivoted-away position.
Figure 4:
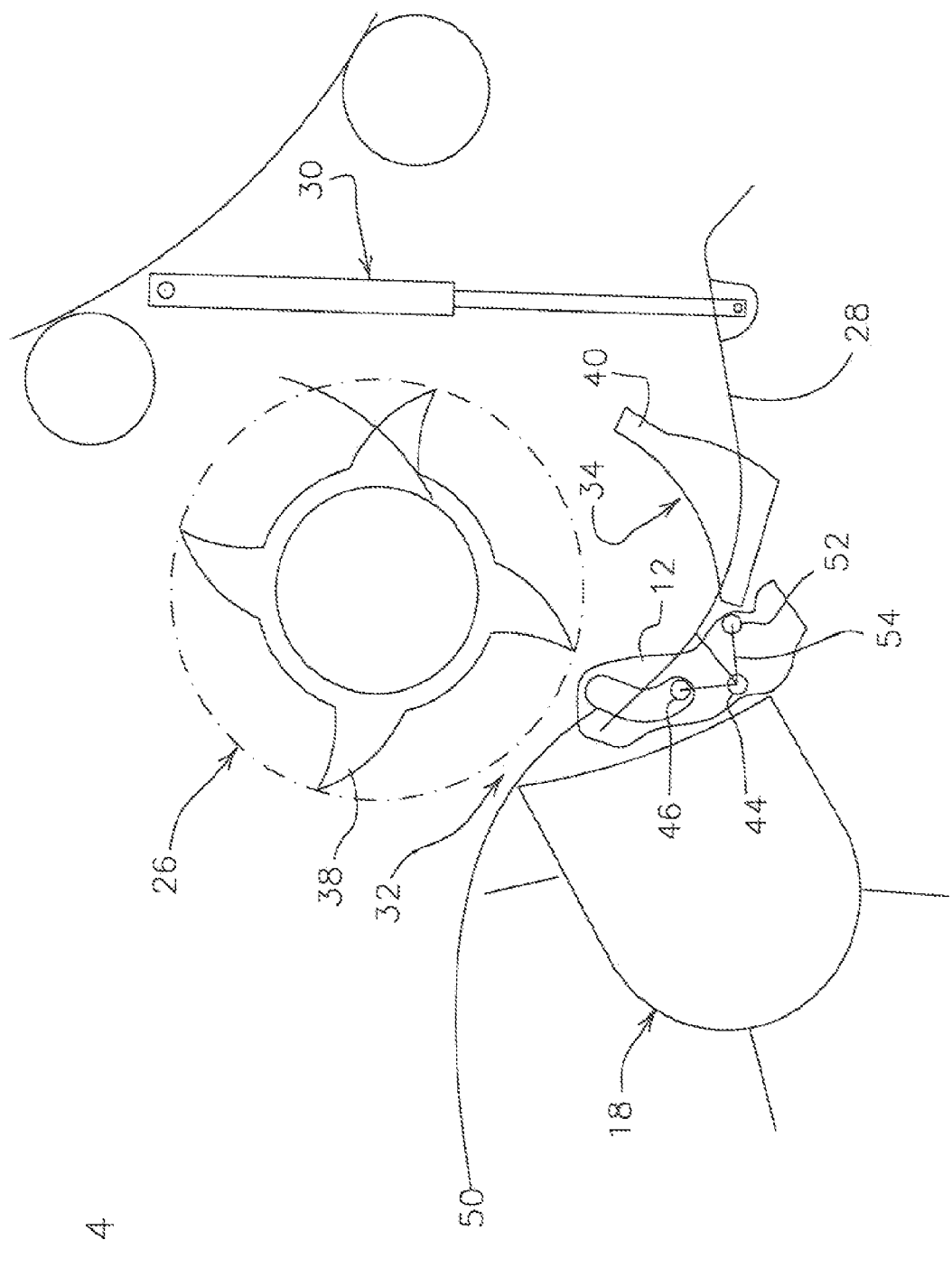
FIG. 4 shows the feed channel wall in a position full pivoted away from the feed rotor.

According to FIG. 2, the feed channel wall 28, both at the upstream and at the downstream end region, is in the position nearest to the feed rotor 26, and the second bearing 46 bears against the upper end of the guide 50; the control apparatus 30 is retracted and the blades 40—insofar as present or installed—reach through the slots in the channel wall 28. In a case in which the amount of crop which makes its way into the feed channel 36 and is pressed by the feed rotor 26 against the feed channel wall 28 is such that the control apparatus 30 is moved counter to the force of the spring 56, the following occurs. The pressure exerted on the rod end of the piston of the control apparatus 30 surmounts the force of the spring 56 resulting in the feed channel wall 28 pivoting away from the feed rotor 26, to be precise about an imaginary pivot point obtained from the interaction of the first bearing 44, the link 54, the machine-side bearing 52, the second bearing 46 and the guide 50. During this pivotal motion, the link 54 leads the second bearing 46 in the guide 50, so that the said second bearing cannot fall there, but rather can only slide in a controlled manner. The connection by means of the link 54 leads also to a forced motion of the second bearing 46 and thus of the upstream end of the feed channel wall 28 away from the feed rotor 26. This forced motion derives from the fact that the link 54 is deflected out of the straight line connecting all the bearings 44, 46, 52 a triangle is formed, the hypotenuse of which extends between the second bearing 46 and the machine-side bearing 52 and becomes shorter the further the feed channel wall 28 pivots away from the feed rotor 26. In this case, the guide 50 also acts as a lateral bearing contact for the second bearing 46, so that the triangle must be formed. In FIG. 3, an intermediate step is represented, whilst in FIG. 4 the second bearing 46 bears against the lower end of the guide 50 and essentially a right-angled triangle has been formed.

Having described the preferred embodiment, it will become apparent that various modifications can be made without departing from the scope of the invention as defined in the accompanying claims.

The invention claimed is:

1. A feed channel wall for an agricultural harvester, the feed channel wall having an upstream bearing and a downstream connector, a control apparatus coupled to said downstream connector, and a link coupled between the upstream bearing and a fixed machine-side bearing, the improvement comprising: a second bearing coupled to said feed channel wall at the upstream end region thereof; and an upright, fixed machine-side guide receiving said second bearing wherein said downstream connector is located proximal to a downstream end of the feed channel wall and said upstream bearing, said second bearing and said machine-side bearing lie essentially on a straight line when the second bearing is located in an upper end region of the guide, and said upstream bearing, said second bearing and said machine-side bearing form the corners essentially of a right-angled triangle when the second bearing is located in a lower end region of the guide.

2. The feed channel wall according to claim 1, wherein said guide has a curvature.

3. The feed channel wall according to claim 1, wherein said control apparatus can be actuated by an external force.

4. The feed channel wall according to claim 1, wherein said control apparatus is controlled in dependence on at least one parameter of a fed crop flow.

5. The feed channel wall according to claim 1, wherein said control apparatus is acted upon by a spring.

* * * * *